United States Patent [19]
Ludwig

[11] 3,739,325
[45] June 12, 1973

[54] METHOD AND DEVICE FOR EVALUATING ECHO SIGNALS WITH ECHO SOUNDING SYSTEMS HAVING DIGITAL INDICATION

[75] Inventor: Reinhard Ludwig, Kiel, Germany

[73] Assignee: Electroacustic Gesellschaft m.b.H., Kiel, Germany

[22] Filed: June 10, 1971

[21] Appl. No.: 151,847

[30] Foreign Application Priority Data
June 13, 1970 Germany.................. P 20 29 311.2

[52] U.S. Cl. ............................... 340/3 R, 340/1 R
[51] Int. Cl. .............................................. G01s 9/68
[58] Field of Search ..................... 340/1 C, 1 R, 3 R

[56] References Cited
UNITED STATES PATENTS
3,500,302   3/1970   Moss, Jr. et al..................... 340/3 R
3,539,978   11/1970   Stedtnitz............................. 340/3 R FOREIGN PATENTS OR APPLICATIONS
835,491   5/1960   Great Britain ...................... 340/3 R Primary Examiner—Richard A. Farley
Attorney—Curt M. Avery, Arthur E. Wilfond, Herbert L. Lerner and Daniel J. Tick

[57] ABSTRACT

Method of evaluating echo signals with echo sounding systems having digital indication of the sounding depth determined by the transmission time of the bottom echo includes comparing the transmission time of at least those echo signals having the intensity of bottom echos appearing in a given sounding period with the transmission time corresponding to the sounding results of a preceding sounding period and, from these echo signals, evaluating as bottom echo that signal having a transmission time differing least from the transmission time of the echo signal evaluated as bottom echo in the preceding sounding period; and system for carrying out the method.

4 Claims, 6 Drawing Figures

METHOD AND DEVICE FOR EVALUATING ECHO SIGNALS WITH ECHO SOUNDING SYSTEMS HAVING DIGITAL INDICATION

The invention relates to method and system for evaluating echo signals with echo sounding systems having digital indication of the sounding depth determined by the transmission time of the bottom echo.

Digital or numerical indication has a known advantage over analog indication of echographs, which the echo pulses are plotted with respect to the location and intensity thereof and the depth values thereof are read on an applied scale, in that reading from a numerical register is more convenient and is more reliable with respect to the possibility of errors.

A disadvantage of digital indication is, however, that one cannot tell from the indicated digital value if it actually relates to the water depth i.e., if the echo signal producing the indication was a bottom echo and not perhaps a fish echo or an interference echo; with an echograph, on the other hand, one can readily obtain assurance regarding such question by a glance at the echograph.

Two methods have been known heretofore which are supposed to assure that only the bottom echo of the received echos will always result in a digital indication.

One of these known methods is based upon the assumption that the bottom echo is the most intense echo of the sounding period. Consequently, in this known method, that echo is selected and indicated which is more intense than all the previous received echos of the same sounding period. This known method fails regularly, however, when fish echos are received from low depths because these very weak echos, in themselves, are weakened far less on the short travel path thereof than are the bottom echos over their considerably longer travel paths, and such fish echos can consequently be received with the same or even greater intensity than the bottom echo. In the same manner, intense transmission pulses of neighboring operating sounding equipment will cause a faulty indication as aforementioned.

The second heretofore known method depends upon the assumption that the water depth to be measured normally varies only slightly from one sounding period to the next one, so that the transmission periods of the bottom echos of pairs of successive sounding periods do not differ very sharply from one another. Accordingly, with this second known method, the receiving channel of the echo sounding equipment is freed for reception in each sounding period only for a limited interval of time during which the appearance of a bottom echo is to be expected. The position of this time interval within the sounding period is automatically adjusted respectively in accordance with the last depth indication. This second known method fails naturally when there are sudden sharp changes in the water depth and, besides, always when interference pulses occur in the time interval when the receiving channel is free, before the appearance of the bottom echo. These interference pulses can additionally effect such a shift of the time interval that the next bottom echo is located outside this interval. The sounding equipment then remains permanently disrupted and in any event until a bottom echo appears which accidentally falls within the shifted time interval.

It is accordingly an object of the invention to provide method and system for evaluating echo signals with echo sounding systems having digital indication which avoids the foregoing disadvantages of the heretofore known methods and systems of this general type. More specifically it is an object of the invention to provide such method and system of evaluation which is more reliable than the heretofore known methods and systems of this general type against faulty or erraneous measurements.

With the foregoing and other objects in view, there is provided in accordance with the invention, method of evaluating echo signals with echo sounding systems having digital indication of the sounding depth determined by the transmission time of the bottom echo which comprises comparing the transmission time of at least those echo signals having the intensity of bottom echos appearing in a given sounding period with the transmission time corresponding to the sounding results of a preceding sounding period and, from these echo signals, evaluating as bottom echo that signal having a transmission time differing least from the transmission time of the echo signal evaluated as bottom echo in the preceding sounding period.

Of course, a sufficiently intense interference pulse could cause a false depth indication under adverse conditions even with the method of the invention, however the indication error remains limited only to the sounding period in which the interference pulse has appeared; the interference pulse would thus not cause disruption of the sounding equipment over many unforeseeable sounding periods as in the case of the aforementioned second heretofore known method. Above all, proper operation of the sounding equipment is not thereby dependent upon the fact that a sudden sharp change in the water depth remain limited to a specific measurement or extent.

A choice of amplitude based on the criterion of the most intense of all the received echo signals is believed to be advantage, and accordingly forms another feature of the method of the invention. It is sufficient, however, in accordance with the invention for the bottom echo to be at least occasionally the most intense echo of the sounding period.

In accordance with the system for evaluating echo signals with echo sounding systems having digital indication, in accordance with the invention there is provided a pulse generator for generating pulses as time traces which is capable of being started or triggered simultaneously with the transmission of a sounding pulse, the pulse generator being connected to a pulse counter for feeding the time tracing pulses thereto. Two data storages are provided, the first of which (intermediate storage) is adapted to store a momentary pulse counter reading in response to every sufficiently intense echo signal, while the second data storage (indicator storage) serves to accept the data content of the first data storage at the latest by the start of the next sounding period. A comparator is also provided for continuously comparing the counter reading of the pulse counter with the data content of the indicator storage, the comparator having an output connected to a sawtooth wave generator for controlling the same so that, depending upon whether the counter reading is less than or exceeds the data content of the indicator storage, it will emit a respective increasing and decreasing voltage. An AND-gate is also provided having a first input connected to the output of a transistor stage controlled by the sawtooth wave generator and emitting a logical L for a sawtooth wave voltage ≠ 0, a second input connected to the output of a receiver for the echo signal, and an output for the AND-gate connected to switch means of the intermediate storage for releasing the stored data content thereof and to other switch means for resetting the output voltage of the sawtooth wave generator to zero.

Other features which are considered as characteristic for the invention are set forth in the appended claims.

Although the invention is illustrated and described herein as method and device for evaluating echo signals with echo sounding systems having digital indication, it is nevertheless not intended to be limited to the details shown, since various modifications may be made therein without departing from the spirit of the invention and within the scope and range of equivalents of the claims.

The invention, however, together with additional objects and advantages thereof will be best understood from the following description when read in connection with the accompanying drawing, in which.

Figure 1:
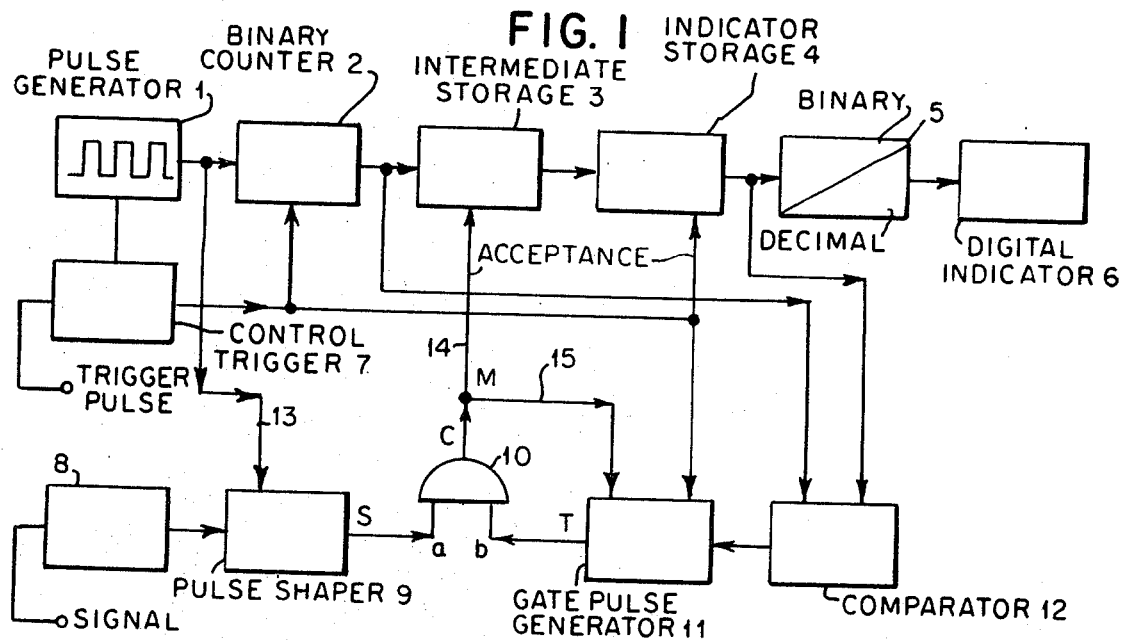
FIG. 1 is a block diagram of the evaluating system of the invention.

Referrying now to the drawings and first, particularly, to FIG. 1 thereof, there is shown a pulse generator 1 whose pulses serve as time traces coordinated with the transmission time. These pulses are fed to a binary counter 2 and, upon the appearance of every echo signal adequately strong for a ground or bottom echo, as described further hereinafter, the respective counter meter reading that is attained is accepted by the intermediate storage 3. The value present in the intermediate storage 3 at the end of a sounding period, and resulting from the control pulse introducing the next sounding period, is accepted or received by an indicator storage 4 and is fed through a binary-to-decimal coder 5 to a digital indicating device 6, the storage being maintained however until the next acceptance.

A control trigger 7 is triggered by the pulse releasing the sounding pulse transmission and thereby emits a pulse for controlling various functions. Firstly, this pulse synchronizes the pulse generator 1 in that it brings the voltage thereof into a defined phase position for example the beginning of the pulse, coordinated with the start of the sounding period; furthermore, it sets the binary counter 2 at zero, causes the acceptance by the indicator storage 4 of the data content from the intermediate storage 3, and starts a gate pulse generator 11 having an output connected to the input b of an AND-gate 10. The gate pulse generator 11 is formed of a sawtooth generator and a transistor stage controlled thereby, described hereinafter more fully with respect to FIG. 3.

The arriving echo signals first appear at the receiving amplifier 8. As indicated, the latter is furnished with a threshold value stage so that it passes only such echo signals that are strong enough as to be qualified as bottom echos. At the output of the receiving amplifier 8, a pulse shaper 9 is connected which transforms the echo pulses into rectangular pulses. In order that these rectangular pulses may have the same pulse duration as the pulses of the pulse generator 1, the output voltage of the latter is fed over the line 13 to the pulse shaper 9 and there fed together with the echo pulses to a non-illustrated AND-circuit. The rectangular pulses transmitted from the output S of the pulse shaper 9 are delivered to the input a of the AND-gate 10.

The sawtooth generator of the gate pulse generator 11 is controlled at the start thereof by a comparison circuit or comparator 12 which continuously compares the meter reading of the binary counter 2 with the data content of the indicator storage 4. This control operates as follows: As long as the binary counter reading is less than the stored value, the sawtooth generator emits an increasing voltage. When the binary counter reading exceeds the storage value, however, the binary output signal V varies or alternates the comparator 12, for example from O to L, and reverses the sawtooth generator to decreasing sawtooth voltage, the time constant being the same and thereby the slope steepness of the decreasing or declining flank being equal in value to the slope steepness of the increasing or rising flank of the pulse curve. As shown more clearly in FIG. 3, the sawtooth generator controls a special transistor stage so that, as long as the sawtooth voltage differs from zero, a logical L, for example a positive voltage, is delivered to the input b of the AND-gate 10.

Whenever an echo signal reaches the input a of the AND-gate 10, a pulse is emitted from the output c of the latter gate, because the AND-condition is met by the logical L present at the input b. This output signal causes the acceptance of the counter reading through the line 14 by the intermediate storage 3 and, moreover, resets the sawtooth voltage of the sawtooth generator to zero through the line 15.

Figure 2A:
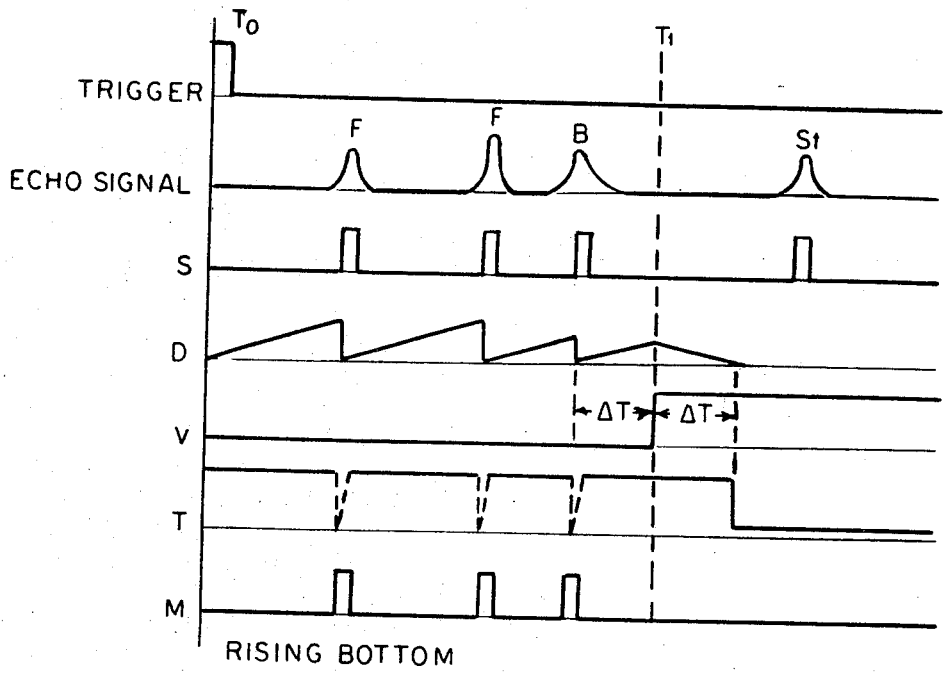
FIGS. 2a and 2b are plot diagrams of the various signal voltages.
Figure 2B:
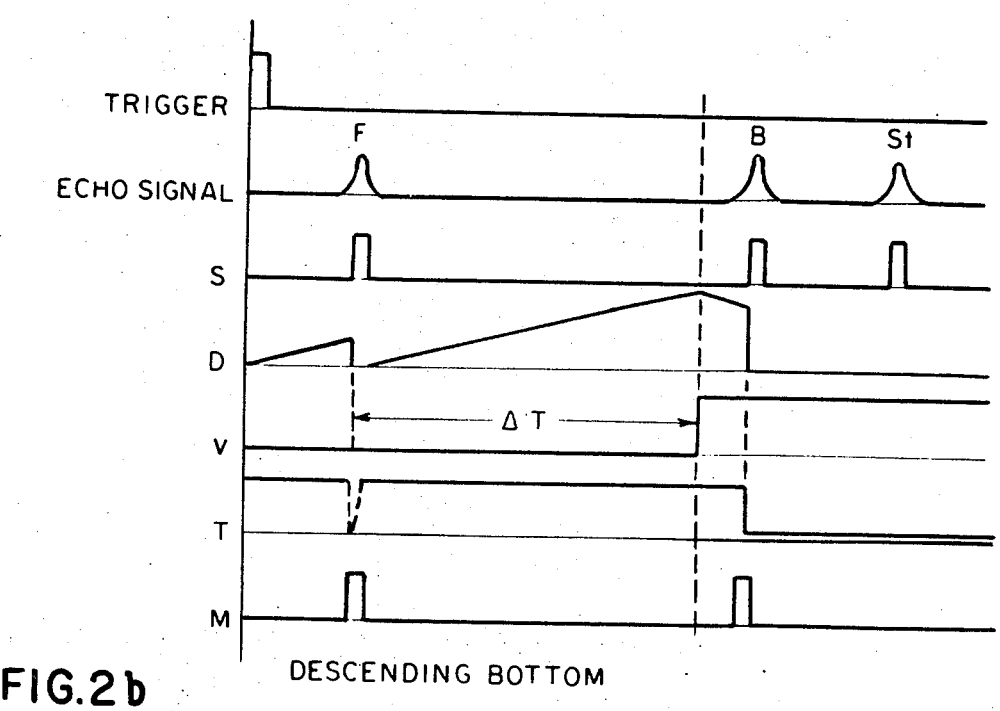

By means of the signal voltage diagrams shown in FIGS. 2a and 2b, the fact that the system of FIG. 1 fulfills the objectives of the invention is clearly explained, as well as the manner in which those objectives are attained.

In FIG. 2a, it is assumed that the bottom or floor of a body of water rises in travel direction of a sounding ship, whereas in FIG. 2b, the bottom or floor.

In each of the two diagrams of FIGS. 2a and 2b, there is shown in the uppermost row, the trigger pulse transmitted at the start of the sounding period. The dotted vertical line $T_1$ signifies the transmission time of the bottom echo determined in the preceding sounding period.

In the diagram of FIG. 2a, two fish echos precede the bottom echo B and, after the instant $T_1$, an interference or disturbance pulse St also follows. Since the condition in FIG. 2a is that of a rising ground or bottom level, the bottom echo B appears before the instant $T_1$. The third line S of FIG. 2a shows the rectangular pulses corresponding to the echo signals. The next lower row D of FIG. 2a represents the course of the voltage of the sawtooth voltage is instituted at the start of the sounding period, but is reset to zero, however, due to every signal pulse that appears, in order to rise again thereafter. When the time $T_1$ is reached, the comparator 12 (FIG. 1) changes the level thereof (note row V of FIG 2a) and reverses the sawtooth generator to decreasing voltage. The time interval $\Delta T_1$ which elapses until the decreasing sawtooth voltage reaches the value zero is actually as great as the time interval elapsing between the bottom echo B and the instant $T_1$. The circuit thus still "awaits," as it were, the appearance of an echo within the time period $\Delta T$ after the instant $T_1$. If an echo should in fact still appear during this waiting period (for example, due to a sudden drop-off of the ground or bottom), this would be evaluated as a bottom echo because it lies closer to $T_1$ than the previously assumed bottom echo B.

Row T of the diagrams of FIGS. 2a and 2b represents the voltage present at the input b of the AND-gate 10 (FIG. 1), and thus the output voltage of the transistor stage controlled by the sawtooth generator. Row M shows the signal pulses which travel sequentially to the output c of the AND-gate 10 (FIG. 1), and effect the storage of the new counter reading. Each of these pulses accordingly also causes a brief interruption of the L at the input b of the AND-gate 10. This has no functional significance, however, and is therefore shown only in dotted lines in row T of FIGS. 2a and 2b.

After the sawtooth generator has reversed to decreasing voltage, the voltage thereof persists at zero after lapse of the time $T_1 + \Delta T$, and the voltage in the row T finally goes from L to O for the continuous sounding period. Since the AND-condition at the AND-gate 10 is thereby no longer met, no subsequent pulse, such as the interference pulse St for example, cannot reach the output c of the AND-gate 10. This signifies that the bottom echo B represents the last and finally evaluated signal of this sounding period.

In the diagram of FIG. 2b, for decreasing bottom level, the bottom echo B appears later than the instant $T_1$, however, yet within the waiting period $\Delta T$ following the instant $T_1$ and extending over and beyond the end of the diagram. Consequently, this bottom echo B sets the decreasing sqwtooth voltage permaturely to zero i.e., before the sawtooth voltage has naturally decreased to zero in accordance with the time constant thereof. The interference pulse St still following behind is excluded from the evaluation for the same reasons as in the case of the increasing bottom level as described hereinabove with respect to FIG. 2a.

Figure 3:
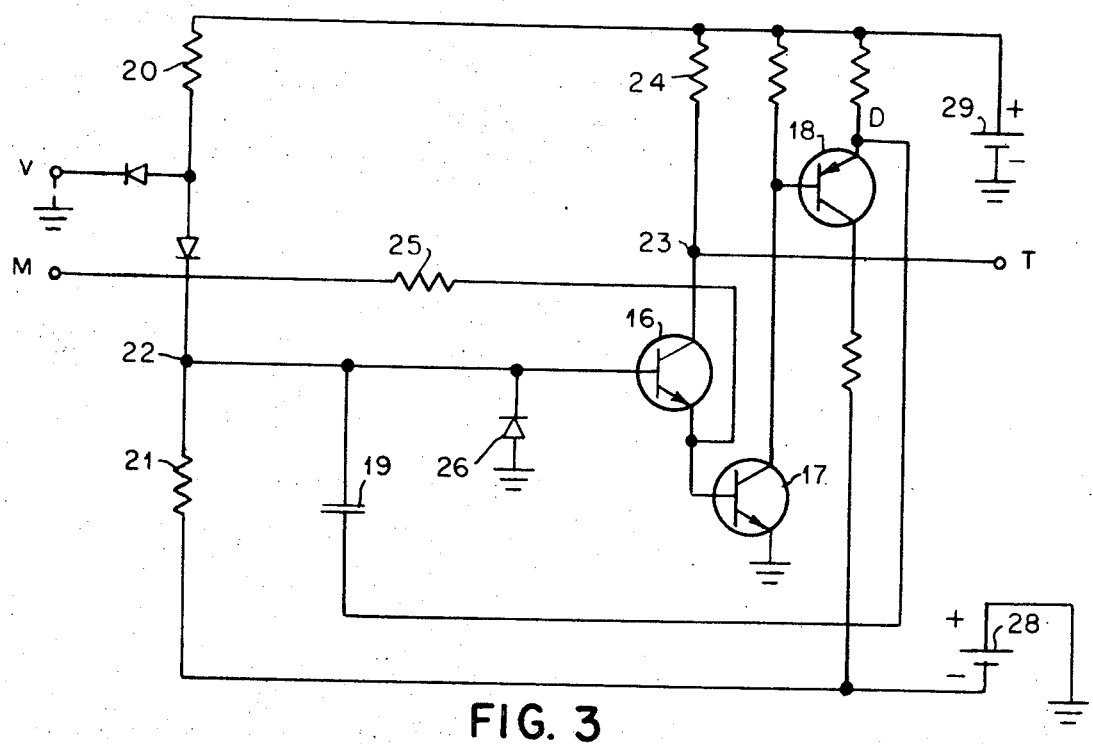
FIG. 3 is a circuit diagram of the sawtooth generator forming part of the system of the invention.

FIG. 3 shows a circuit diagram of the aforementioned gate pulse generator 11 and is, in the case at hand, a Miller integrator which is formed of three transistor stages 16, 17 and 18, the required negative feedback from the transistor stage 18 to the input of the transistor stage 16 being effected through the capacitance 19.

The Miller integrator 16, 17, 18, as is well known, delivers at its output a linearly increasing sawtooth voltage, which can, however, always be reset to zero when positive external voltage is applied to the base of the transistor 17. The capacitance 19 is accordingly discharged through the low-ohmic or low-resistive output of the transistor stage 18 and the diode 26.

Control of the Miller integrator is effected from the start of the sounding period to the instant $T_1$ through the minus pole of the battery 28 and over the resistance 21.

The equal positive voltage of the battery 29, which could be applied through the resistance 20 to the base of the transistor 16, is meanwhile to be considered to be short-circuited, in that the terminal V (the output of the comparator 12) is grounded. The operation of the circuit of FIG. 3 during the expiration of the sounding period is as follows: Whenever an echo pulse appears at the output c of the AND-gate 10 (FIG. 1), a positive voltage surge reaches the terminal M, and is applied through the resistance 25 to the base of the transistor 17 and resets the sawtooth voltage to zero, as is shown in the diagrams of FIGS. 2a and 2b. At the end of this pulse, the sawtooth voltage starts to rise again.

When the instant $T_1$ is reached, the comparator circuit 12 changes its level so that positive voltage now is applied to the terminal V, which neutralizes or removes the short circuit of the positive voltage of the battery 29 which is applied through the resistance 20. The resistances 20 and 21 are of such value that the positive voltage now predominates at the base of the transistor 16 which results in the decreasing of the theretofore increasing controlled sawtooth voltage.

The value of the resistances 20 and 21 is, moreover, chosen so that, with respect to the current branching occurring at the node 22, the control current reaching the base of the transistor 16 has the same value as it had before for the rising or increasing sawtooth. Thus, the time interval from the instant of reversal to the attainment of the voltage zero is the same as that which elapses from the appearance of the last echo signal until the instant of reversal.

When voltage zero is attained at the output D, the negative feedback over the capacitance 19 then ceases. The transistor 16 thereby suddenly becomes fully conductive, and since the transistor 17 consequently also becomes fully conductive, the point 23, which theretofore had a positive potential with respect to ground, is then grounded so that a logical 0 appears at the output T. If a positive signal pulse appears at the terminal M as the sawtooth voltage decreases, also in such case the sawtooth voltage will immediately be reset to zero so that the plus voltage prematurely disappears at the output T.

The transistor stage formed of the transistor 16 and the operating resistance 24 thereof is doubly used here: it is both a component of the Miller integrator and simultaneously the aforementioned transistor stage of the gate pulse generator controlled by the sawtooth generator.

The voltage at the output T of the gate pulse generator can, moreover, be employed as criterion for the regular expiration of the respective sounding period. If this voltage does not go from L to 0 at the latest at the end of the sounding period, this means either that the sounding device has not operated properly or that the water depth has suddenly become greater than the adjusted depth-measuring range. The remaining presence of this voltage T could therefore be used for releasing an alarm signal at the next sounding pulse transmission.

The starting of the Miller integrator at the beginning of the subsequent sounding period occurs, as aforementioned, by resetting the binary counter 2 to zero, because this has the result that the output level V of the comparator circuit 12 changes from L to 0 and thereby again reverses the Miller integrator to increasing sawtooth voltage.

Figure 4:
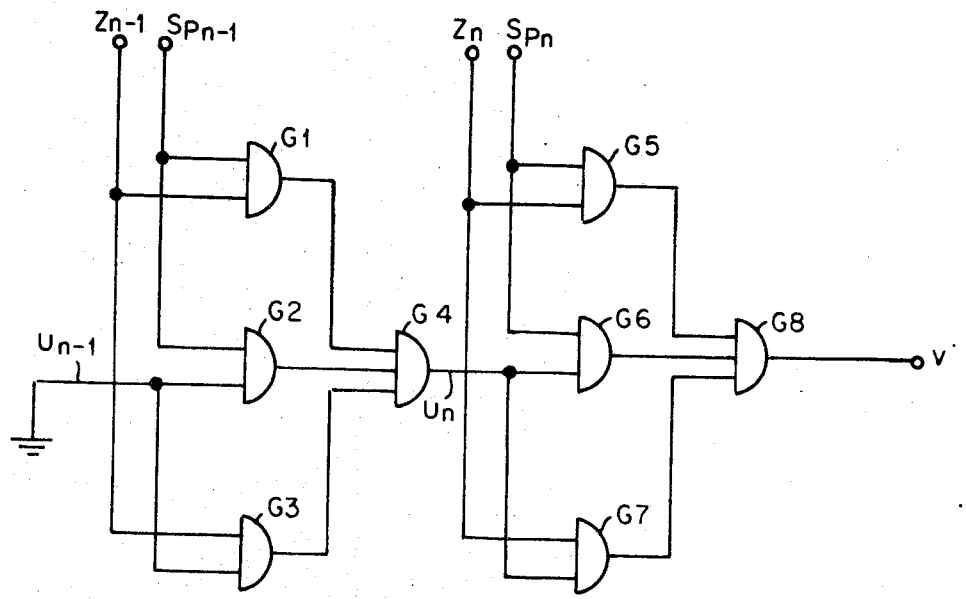
FIG. 4 is a diagram of two stages of the comparison circuit of the system.

FIG. 4 illustrates an embodiment of a circuit of the comparator 12 (FIG. 1), which compares the counter reading with the reading of the indicator storage 4.

Since the counter 2 and the storage, especially the indicator storage 4, operate digitally, a digitally operating comparator circuit is thus also provided.

In the interest of improved clarity and because it is believed to be adequate for explaining the circuit, FIG.

4 only shows two binary or dual locations of the counter and of the indicator storage, thus a two-stage repremention, namely for the locations $Z_{n-1}$, $S_{pn-1}$, and $Z_n$, $S_{pn}$. Each of these two stages is made up of three NAND-gates G1, G2 and G3, on the one hand, and G5, G6 and G7, on the other hand, having outputs respectively leading to the inputs of three-fold NAND-gates G4 and G8.

The output of the NAND-gate G8 is, at the same time, the output of the comparator circuit 12 which leads to the terminal V of the sawtooth generator (FIG. 3) and which, as aforementioned, reverses the sawtooth generator to decreasing sawtooth voltage upon the change from 0 to L.

The terminals identified by reference characters $Z_{n-1}$ and $Z_n$ are to be considered as being connected to the respective counter locations, while the terminals $\overline{Sp_{n-1}}$ and $\overline{Sp_n}$ are connected to the respective storage locations. The manner of writing $\overline{SP_{n-1}}$, $\overline{Sp_n}$ seek to indicate that the inverse storage reading is fed to the comparator circuit 12 i.e., a zero instead of a stored L, and vice versa.

The illustrated circuit of FIG. 4 operates so that at the output of the three-fold NAND-gates G4 and G8 an L will appear only if either the counter reading exceeds the storage reading or if in fact both are equal, however the balance is an L (or if both conditions are met).

The transmission line $U_{n-1}$ connected to one of the inputs of the NAND-gate G2 is grounded so that the balance thereof is always zero. A consequence thereof is that at the output of the NAND-gate G4, an L can appear only if the first condition is met, that is, if the counter reading $Z_{n-1}$=L and $S_{pn-1}$=0. This is characteristic for the lowest binary or dual location.

For each higher binary or dual location, the locations $Z_n$ and $S_{pn}$ in the present case, it is sufficient for any one of the aforementioned conditions to be met.

The transmission line $U_n$ is located at the output of the NAND-gate G4. In the case an L appears thereat, an L can also appear at the output of the NAND-gate G8 (in accordance with the second condition) if $Z_n$ and $S_{pn}$ are equal, that is, both have an L or both have a zero.

Figure 5:
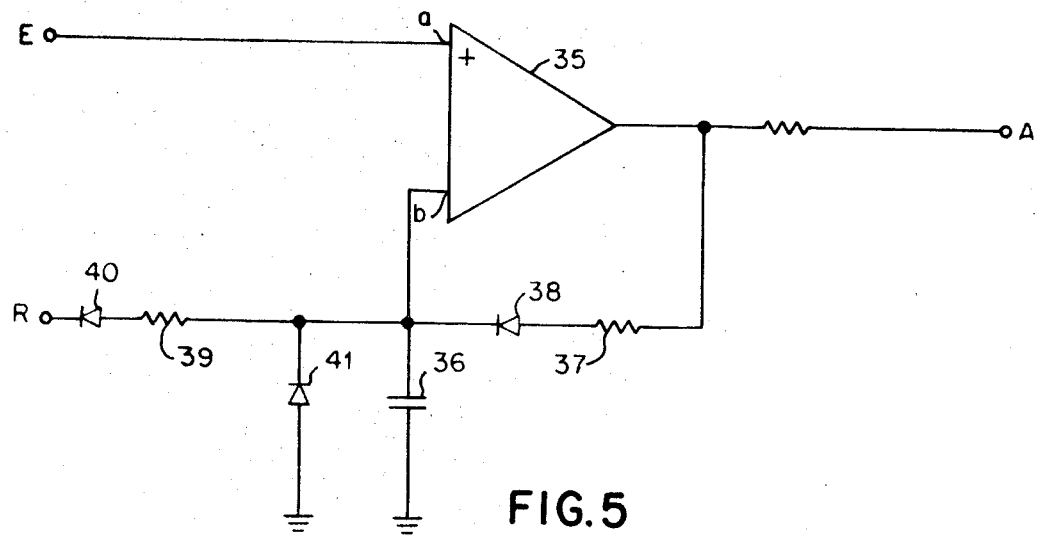
FIG. 5 is a diagram of the amplitude selection circuit of the system.

FIG. 5 shows an amplitude selector circuit which may be used in accordance with the invention in the receiving amplifier 8 (FIG. 1).

A differential amplifier 35 is shown in FIG. 5, having a non-inverting input a and an inverting input b. The input a is connected to a terminal E to which the rereived echo signals are conducted.

A capacitor 36 is connected between the input b and ground, and is discharged through a resistance 39 and a diode 40 by a negative restoring or resetting pulse applied to the terminal R at the start of each sounding period. The diode 41 limits the resetting pulse to a value which is harmless to the employed integrated switching circuit.

The circuit of FIG. 5 operates as follows: Whenever an echo pulse appears at the input a having a level that exceeds the voltage applied at the capacitor 36 and thereby at the input b, the differential amplifier always reverses and delivers at the output a high voltage of the same polarity as those voltages present at the inputs a and b, that is, a positive voltage in the instant case. This output voltage charges the capacitor 36 through the resistance 37 and the diode 38 until the voltage of the capacitor 36 is exactly equal to the level of the input signal at the input a. Simultaneously, this output voltage is fed to the output terminal A and from there to the evaluating device connected thereto.

From the foregoing it is therefore concluded that each succeeding echo signal produces a voltage at the output of the differential amplifier 35 only when it is greater than the greatest of the echo signals appearing theretofore.

I claim:

1. System for carrying out a method of evaluating echo signals with echo sounding systems having digital indication of the sounding depth determined by the transmission time of the bottom echo, comprising a pulse generator for generating pulses as time traces which is actuable simultaneously with transmission of a sounding pulse, a pulse counter connected to said pulse generator for receiving time tracing pulses therefrom, a first storage connected to said pulse counter for storing a momentary pulse counter reading in response to all echo signals of given minimum intensity, a second storage connected to said first storage for receiving therefrom data content of said first storage at latest by the start of a next succeeding sounding period, comparator means connected to said pulse counter and said second storage for continuously comparing the reading of said counter with the data content of said second storage, said comparator means having an output, a sawtooth wave generator connected to said output of said comparator means and controllable thereby so as to emit an increasing and decreasing voltage whenever the counter reading is respectively less than and exceeds the data content of said second storage, AND-gate means having a first input, a transistor stage having an output connected to said first input of said AND-gate means said transistor stage being controllably connected to said sawtooth generator for emitting a logical L for a sawtooth wave voltage ≠ 0, receiver means for the echo signals, said AND-gate means having a second input connected to said receiver means, switch means for said first storage for releasing the stored data content thereof, and other switch means for resetting the output voltage of said sawtooth wave generator to zero, said AND-gate means having an output connected to both of said switch means.

2. System according to claim 1 wherein said sawtooth wave generator is comprised of a Miller integrator.

3. System according to claim 2 wherein said transistor stage also forms part of said Miller integrator.

4. System according to claim 1 wherein said echo signal receiver means comprises a differential amplifier having an output and an inverting and a non-inverting input, an echo signal receiving channel connected to said non-inverting input, a charging capacitance of a peak value rectifier circuit connected to said inverting input, said rectifier circuit having an input connected to the output of said differential amplifier.

* * * * *